Nov. 10, 1936. W. F. RAY 2,060,120
MANUFACTURE OF BATTERY BOXES
Filed April 17, 1934 2 Sheets-Sheet 1

INVENTOR.
William F. Ray
BY
ATTORNEY.

Nov. 10, 1936.  W. F. RAY  2,060,120
MANUFACTURE OF BATTERY BOXES
Filed April 17, 1934   2 Sheets-Sheet 2
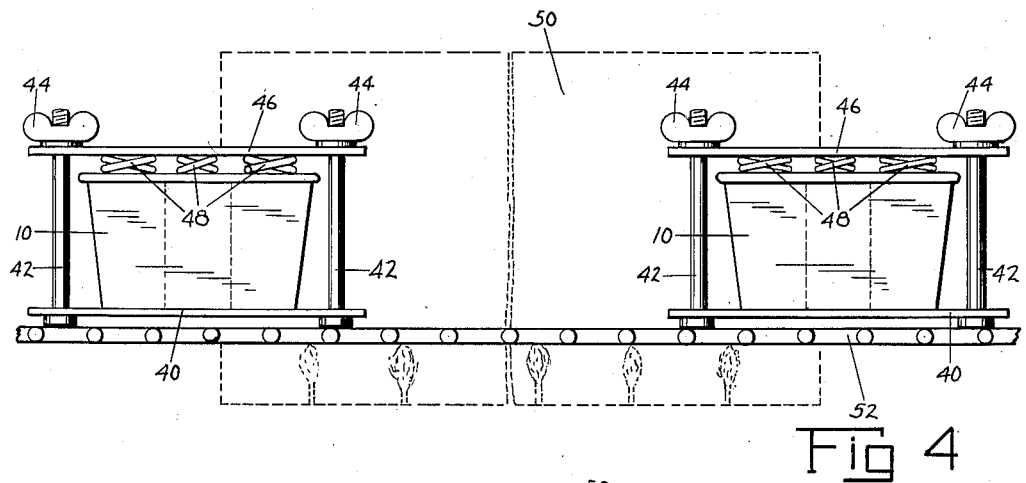
Fig 4
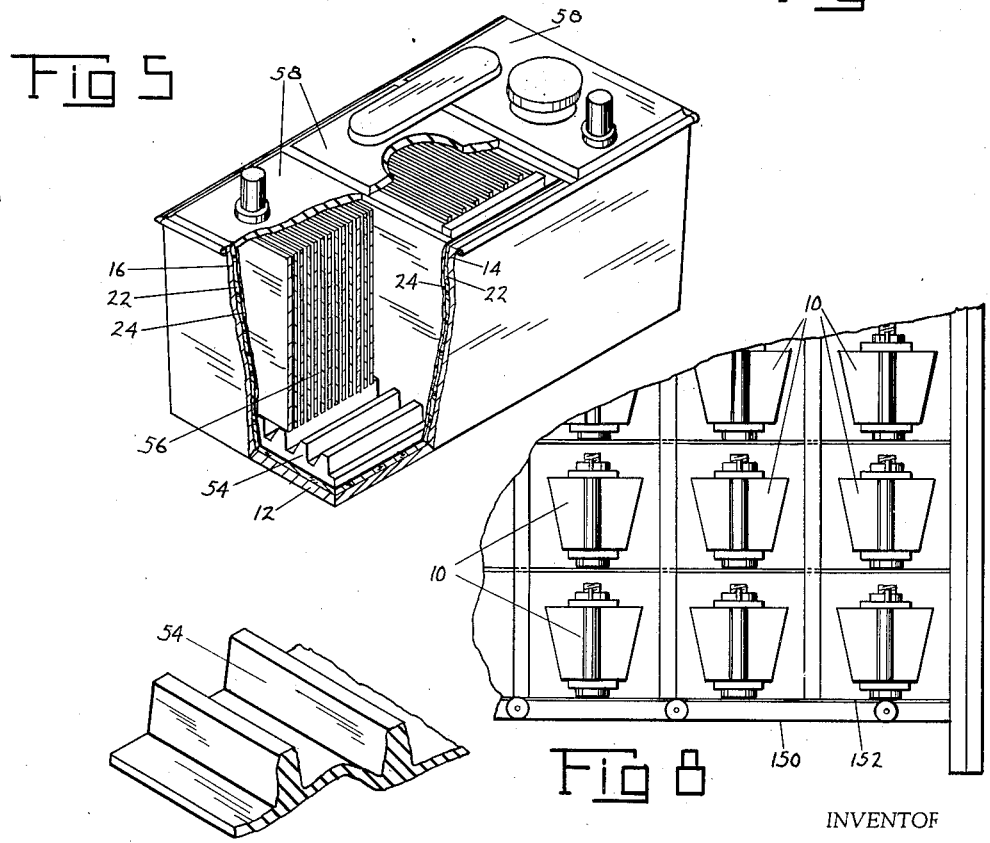
Fig 5
Fig 6
Fig 8
INVENTOR
William F. Ray
BY
Jn. W. McConkey
ATTORNEY.

Patented Nov. 10, 1936

2,060,120

UNITED STATES PATENT OFFICE 2,060,120

MANUFACTURE OF BATTERY BOXES

William F. Ray, Chicago, Ill., assignor, by mesne assignments, to Rubberized Metal Containers, Incorporated, Chicago, Ill., a corporation of Illinois Application April 17, 1934, Serial No. 720,917

5 Claims. (Cl. 18—59)

This invention relates to battery boxes and the like, and will be described in connection with a novel process by which an improved box can be manufactured at less cost than by the methods now in use.

An important object of the invention is to facilitate and lessen the cost of the step of curing a coating of rubber compound or other rubberlike material which in the finished box forms an unbroken insulating coating over the entire interior of the box, including the partitions if a sectional box is used. Heretofore this step has usually been carried out by heating the curable rubberlike material in a mold, and has therefore been relatively slow and expensive.

According to one feature of my invention the boxes, with the uncured material in place, are arranged in individual units or assemblies including means for holding the curable material under pressure, and these units are fed separately (for example by a conveyor) through an oven or other heating means which cures the coating. I prefer to use a separate clamping device for each of these assemblies, the illustrated devices having yokes or the like engaging the bottoms of the battery containers, and having a series of springs or the like individually yieldingly applying pressure to each of the several compartments of the box.

An important feature of the invention relates to the convenient and rapid assembly of such units under considerable pressure, by utilizing a tapered core or core assembly fitting into the interior of a tapered container or reinforcement forming the body of the walls and bottom of the finished box. Where, as is usually the case, it is desired to form the box in compartments, this core assembly is in sections, the end sections being tapered or flared on opposite sides as well as on the outer ends, while the intermediate section has its sides tapering only and has straight ends cooperating with the adjacent straight ends of the end sections to form the partitions.

I prefer to provide the curable rubberlike material in sheet form, wrapping it about the above-described novel cores, which not only facilitates placing this material in place but also places it under heavy pressure as the tapered core assembly is forced into the tapered outer container.

The sheet material is illustrated as extended upwardly on the cores far enough so that its upper margins may be folded smoothly over the top edges of the walls of the container and of the partitions. Usually it is preferable also to apply similar sheet material to the exterior of the box. The box may be plated with brass, or a suitable cement or other bonding material may be used, to insure a good bond between the insulating cured coating and the metal when the material is vulcanized or otherwise cured.

The finished box preferably has separately-formed ribbed bridges on the bottoms of the several compartments, and may have a corresponding series of covers fitting between and supported by the flaring walls of the compartments.

I prefer to take advantage of my novel method of manufacture to improve the structure of the box by providing in the walls and bottom (and in the partitions if desired) cushioning material such as sheet cork or the like. Sheets of this material may be placed on the bottom of the container and against its sides, and also if desired between the core sections to become parts of the partitions, so that when the cores carrying the sheet curable rubberlike material are forced into place they force the cushioning material smoothly against the bottom and walls of the container. The sheet cork or its equivalent may be coated with rubber cement or other bonding compound which will cause the rubber to bond firmly to the cork.

In this construction, the upper margins of the sheet curable material are folded smoothly over the upper edges of the cushioning sheets and on across the edges of the container walls, thereby imperviously sealing the joint between the cork and the walls, and inclosing the cushioning material inside of a smooth unbroken insulating wall.

The above and other features and advantages of my invention, including advantageous steps in the process of manufacture as well as desirable structural combinations and specific arrangements, will be apparent from the following description of the structures and the process illustrated in the accompanying drawings, in which:

Figure 4 is a longitudinal diagrammatic section showing the feeding of a series of assemblies, held individually under pressure, on a conveyor through an oven;

Figure 5 is a perspective view of a finished battery embodying my novel box, partly broken away to show its structure;

Figure 6 is a partial perspective of one of the bridges, on a larger scale;

Figure 8 is a diagram of an alternative method of curing the assemblies.

Figure 1:
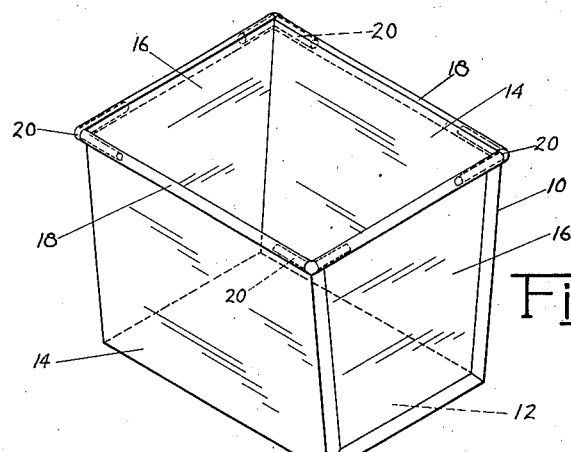
Figure 1 is a perspective view of one form of the tapered metallic container or reinforcement forming the body of the bottom and walls of my novel battery box.

The novel battery box may have, as the body of its structure, a container or reinforcement 10 of steel or other metal, shown as formed from a stamped blank folded up to provide a flat bottom 12 and upwardly flaring tapered side walls 14 and end walls 16. The upper edges of the walls are rolled into a bead 18, reinforced at the corners if desired by right-angle sections 20 of steel wire.

Unless some other bonding material is to be used, I prefer to plate the container 10 with a material such as brass which will vulcanize permanently to rubber.

If, as I prefer, sheet cork or other cushioning material is to be used, I place sheets 22 thereof upon the bottom 12 and against the sides 14 and 16 of the container, these sheets being coated on their other sides with rubber cement or other bonding material.

Sheets 24 of curable rubber compound or other rubberlike material, of any desired composition (many of which are well known), are next wrapped smoothly upon sections 26, 28, and 30 of a novel tapered three-part metal or metal-covered core. The two end sections 26 and 30 are tapered on their outer ends as well as on their opposite sides, whereas the intermediate section 28 is tapered only on its sides, so that the entire core assembly just fits into the container 10.

As a convenient means of handling the cores, I provide each of them with openings 29 defining tongues 31 beneath which suitable separate handle or tong devices may readily be hooked.

Figure 2:
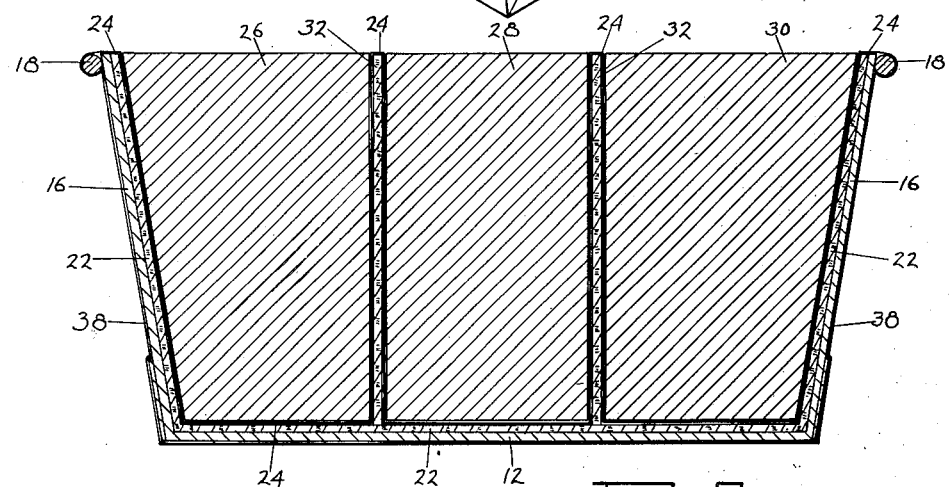
Figure 2 is a longitudinal section through an assembly of one of the tapered containers with the sectional core, and with the cushioning material and the rubberlike material in place, but before the clamp is applied to put the whole assembly under pressure.
Figure 3:
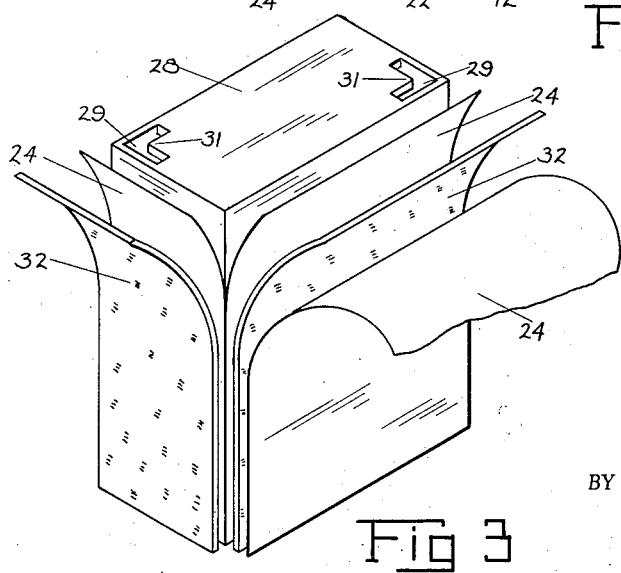
Figure 3 is a perspective view of one section of the core, with the rubberlike sheet material and the cork or its equivalent in place.

If the partitions are to include other material than the rubberlike material 24, it is placed between the wrapped core sections as shown at 32 in Figure 2. If additional strength is required, the parts 32 may be of brass-plated steel, and if desired they may be riveted or welded or otherwise secured to the walls 14, and the wrapped core sections inserted separately in the compartments thus formed. However, I usually find the box is amply strong without steel partitions, and in that case I prefer to embody sheets 32 of cork or other cushioning material in the partitions.

The use of flexible, or at least non-rigid, partitions when feasible has the advantage of facilitating the insertion in the finished box of an oversize plate assembly without cracking or injuring the partition.

Figure 7:
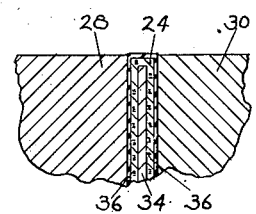
Figure 7 is a partial section corresponding to part of Figure 2, but showing a modification.

In Figure 7 is shown a modification in which there is in the partition a steel plate 34 welded to the side walls 14 and faced on both sides with cushioning material 36 such as sheet cork.

In most cases, the exterior of the box is also coated or wrapped with a sheet or layer 38 of the curable rubberlike material. These outer sheets fit smoothly into the angle under the bead 18. The upper margins of the interior sheets 24 are folded smoothly over the upper edges of the layers 22 and 36 of cushioning material (if used), and thence over the upper edges of the side and end walls 14 and 16, and around the bead 18 into the angle beneath it.

The entire assembly is next placed under pressure by means which, with the box and the cores, forms a separate unit or assembly which can be handled as such, individually. In the arrangement illustrated, a yoke is formed of a plate 40 engaging the bottom of the box (Figure 4) and having at its ends bolts or posts 42 threaded at their upper ends to receive thumb nuts or other clamping means 44.

The nuts 44, or their equivalents, act on clamp means such as a pressure plate 46, shown acting individually and yieldingly on the several core sections through springs or the like 48. Thus when the nuts 44 are tightened, the tapered cores are forced into the tapered container to hold the curable material 24 under heavy pressure.

A series of these assemblies may conveniently be passed through an oven or the like shown diagrammatically at 50, by means such as a belt or other conveyor 52. Thus the process is especially well adapted for mass production, as the expensive and slow step of vulcanizing in molds is eliminated.

In the alternative method illustrated in Figure 8, a large number of the assemblies, held under pressure by their clamps, are loaded on a truck or the like 152, and the truck with its entire load wheeled into a large oven 150 which is preferably heated by steam.

Usually it is desirable to furnish each compartment with a ribbed bridge 54, which may be of hard rubber, and which rests on the bottom of the compartment to support the usual plates 56. The tops 58 of the compartments are shown fitting between and supported by the flaring walls of the container, thus obviating the supporting shoulder usually provided in battery boxes.

While one particular construction, and one series of operations, have been described in detail, it is not my intention to limit the scope of the invention by that description or otherwise than by the terms of the appended claims.

I claim:

1. That method of making a battery box or the like which comprises forming a tapered metal reinforcement having four sloping sides and a bottom, providing three cores to fit as a unit within said reinforcement, wrapping curable rubberlike material on the sides and bottoms of the cores, arranging the wrapped cores within the reinforcement with cushioning material between the cores and the sides and bottom of the reinforcement and between the successive wrapped cores, laying the upper margins of the rubberlike wrappings across the upper edges of the cushioning material and over the upper edges of the side walls of the reinforcement, laying curable material over the outside of the reinforcement, applying yielding pressure exerted between the bottom of the outside of the reinforcement and the tops of the cores to form a unitary assembly in which the tapered cores are urged into the tapered reinforcement to hold the curable material under pressure, and curing said material while it is so held under pressure.

2. That method of making a battery box or the like which comprises forming a tapered metal reinforcement having four sloping sides and a bottom, providing three cores to fit as a unit within said reinforcement, wrapping curable rubberlike material on the sides and bottoms of the cores, arranging the wrapped cores within the reinforcement, laying the upper margins of the rubberlike wrapping across the upper edges of the side walls of the reinforcement, laying curable material over the outside of the reinforcement, applying yielding pressure exerted between the bottom of the outside of the reinforcement and the tops of the cores to form a unitary assembly in which the tapered cores are urged into the tapered reinforcement to hold the curable material under pressure, and curing said material while it is so held under pressure.

3. Apparatus for carrying out the described method of making battery boxes or the like comprising a plurality of separate cores, the end ones of which have their sides and one end face inclined and the intermediate one of which has its two ends straight and its two sides inclined, whereby the cores when put togethr form a tapered assembly and a clamp engagable with said cores and a metal box for yieldingly holding the cores in the box.

4. That method of making a battery box or the like which comprises, forming a metal container having sides and a bottom, forcing a core into the container with curable material between the core and the container, clamping the core in place in the container to form an assembly which can be handled as a unit, and passing the assembly through a heating chamber to cure said material.

5. That method of making a battery box or the like which comprises, forming a metal container having sides and a bottom, lining said container with cushioning material forcing a core into the lined container with curable material between the core and the cushioning material, clamping the core in place in the container to form an an assembly which can be handled as a unit, and passing the assembly through a heating chamber to cure the curable material.

WILLIAM F. RAY.